US012759647B2

(12) United States Patent
Prior et al.

(10) Patent No.: US 12,759,647 B2
(45) Date of Patent: Oct. 13, 2026

(54) VEHICLE TAILGATE MATERIAL SHIELD ASSEMBLY

(71) Applicant: Ford Global Technologies, LLC, Dearborn, MI (US)

(72) Inventors: Joseph Prior, Detroit, MI (US); Marc Beeman, Grosse Pointe Woods, MI (US); Joshua Robert Hemphill, White Lake, MI (US); Raul Ezequiel Alvarez Ruiz, Estado de Mexico (MX); Francis Raymond Gillis, Farmington Hills, MI (US); Michael Shawn Watterworth, Brighton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 570 days.

(21) Appl. No.: 18/357,631

(22) Filed: Jul. 24, 2023

(65) Prior Publication Data

US 2025/0033711 A1 Jan. 30, 2025

(51) Int. Cl.
*B62D 33/037* (2006.01)
*B62D 33/027* (2006.01)
*B62D 33/03* (2006.01)

(52) U.S. Cl.
CPC ....... *B62D 33/037* (2013.01); *B62D 33/0276* (2013.01); *B62D 33/03* (2013.01)

(58) Field of Classification Search
CPC ... B62D 33/037; B62D 33/0276; B62D 33/03
USPC .......................................................... 296/50
See application file for complete search history.

(56) References Cited

U.S. PATENT DOCUMENTS

| | | | | |
|---|---|---|---|---|
| 3,387,406 | A * | 6/1968 | Coker | E05D 15/52 49/192 |
| 3,567,274 | A | 3/1971 | Kaptur, Jr. et al. | |
| 4,383,709 | A * | 5/1983 | Ronan | E05B 17/2003 292/346 |
| 5,215,342 | A * | 6/1993 | Yuge | E05B 85/045 292/DIG. 41 |
| 5,685,594 | A * | 11/1997 | Harper | B62D 33/0273 296/57.1 |
| 6,155,618 | A * | 12/2000 | Ichinose | E05B 85/045 292/216 |
| 6,471,260 | B1 * | 10/2002 | Weinerman | E05C 3/24 292/216 |
| 6,742,826 | B2 * | 6/2004 | Humphrey | B62D 33/0273 296/57.1 |
| 7,052,070 | B1 | 5/2006 | Simonin | |

(Continued)

FOREIGN PATENT DOCUMENTS

| | | | | |
|---|---|---|---|---|
| DE | 19649743 | A1 * | 6/1997 | E05B 15/029 |
| FR | 2927923 | A1 * | 8/2009 | E05B 15/024 |
| KR | 101024989 | B1 * | 3/2011 | E05B 77/34 |

*Primary Examiner* — Hilary L Gutman
(74) *Attorney, Agent, or Firm* — Vichit Chea; Carlson, Gaskey & Olds, P.C.

(57) ABSTRACT

A vehicle assembly includes a striker of a tailgate assembly, and a door subassembly of the tailgate assembly. The door subassembly has a latch configured to engage the striker to hold the door subassembly in a door closed position. The door subassembly has a notched area that receives the striker when the door subassembly is pivoted from a door open position to a door closed position. A material shield extends into the notched area when the door subassembly is in the door closed position.

8 Claims, 4 Drawing Sheets

(56) References Cited

U.S. PATENT DOCUMENTS

| | | | | |
|---|---|---|---|---|
| 7,165,800 | B2 * | 1/2007 | Thiele | B60P 1/26 296/57.1 |
| 7,243,973 | B2 * | 7/2007 | Plett | E05B 83/16 296/57.1 |
| 7,347,476 | B2 * | 3/2008 | Luehr | B60P 1/435 296/61 |
| 7,481,479 | B1 * | 1/2009 | Townson | B62D 33/0273 296/146.12 |
| 7,690,710 | B2 * | 4/2010 | Townson | E05D 3/10 296/57.1 |
| 8,061,753 | B2 * | 11/2011 | Papanikolaou | B62D 33/0273 296/146.12 |
| 8,128,138 | B2 | 3/2012 | Bambenek et al. | |
| 8,740,279 | B1 * | 6/2014 | McGoff | B62D 33/0273 49/168 |
| 10,358,172 | B2 * | 7/2019 | Morley | B62D 33/0273 |
| 11,273,876 | B2 * | 3/2022 | Mooney | B62D 33/037 |
| 11,325,451 | B2 * | 5/2022 | Nania | B60R 3/02 |
| 11,505,261 | B2 * | 11/2022 | Van Norman | B62D 33/037 |
| 11,584,451 | B2 * | 2/2023 | Gibbs | B62D 33/03 |
| 11,618,509 | B2 * | 4/2023 | Hemphill | B62D 33/0273 296/51 |
| 11,643,151 | B2 * | 5/2023 | Nania | B62D 33/0273 296/51 |
| 2002/0105200 | A1 | 8/2002 | Reynolds et al. | |
| 2003/0122396 | A1 * | 7/2003 | Humphrey | B62D 33/0273 296/51 |
| 2007/0296226 | A1 | 12/2007 | Gruber et al. | |
| 2009/0183433 | A1 | 7/2009 | Cheung et al. | |
| 2011/0316294 | A1 * | 12/2011 | Kim | B62D 25/04 292/340 |
| 2014/0136021 | A1 | 5/2014 | Bambenek et al. | |
| 2016/0200375 | A1 | 7/2016 | Kerr, III | |
| 2018/0274272 | A1 | 9/2018 | Woo et al. | |
| 2019/0185074 | A1 | 6/2019 | Morley et al. | |
| 2019/0193538 | A1 | 6/2019 | Carter et al. | |
| 2021/0237808 | A1 * | 8/2021 | Ghoukasian | B62D 33/037 |
| 2021/0285266 | A1 | 9/2021 | Carter et al. | |
| 2024/0392604 | A1 * | 11/2024 | Prior | B62D 33/037 |

* cited by examiner

VEHICLE TAILGATE MATERIAL SHIELD ASSEMBLY

TECHNICAL FIELD

This disclosure relates generally to a tailgate of a vehicle and, more particularly, to a material shield that can block material from entering gaps within the tailgate.

BACKGROUND

Many motor vehicles include cargo spaces for transporting various types of cargo. A pickup truck, for example, includes a cargo bed that establishes the cargo space of the truck. A tailgate typically encloses one end of the cargo bed. The tailgate is movable to an open position to provide access to the cargo bed.

SUMMARY

In some aspects, the techniques described herein relate to a vehicle assembly, including: a striker of a tailgate assembly; a door subassembly of the tailgate assembly, the door subassembly having a latch configured to engage the striker to hold the door subassembly in a door closed position, the door subassembly having a notched area that receives the striker when the door subassembly is pivoted from a door open position to a door closed position; and a material shield extending into the notched area when the door subassembly is in the door closed position.

In some aspects, the techniques described herein relate to a vehicle assembly, wherein the striker is aft the material shield.

In some aspects, the techniques described herein relate to a vehicle assembly, wherein the material shield is overmolded to a flange.

In some aspects, the techniques described herein relate to a vehicle assembly, wherein the striker is part of a striker bracket, wherein the material shield is mounted to a flange of the striker bracket.

In some aspects, the techniques described herein relate to a vehicle assembly, wherein striker is a first striker and the material shield is a first material shield that is associated with the first striker, wherein the striker bracket includes the first striker and a second striker, wherein a second material shield is mounted to the striker bracket, the second material shield associated with the second striker.

In some aspects, the techniques described herein relate to a vehicle assembly, wherein the striker is mounted to a frame subassembly of the tailgate assembly.

In some aspects, the techniques described herein relate to a vehicle assembly, wherein the door subassembly is hinged to the frame subassembly and configured to pivot relative to the frame subassembly about a vertically extending axis the material shield extending horizontally from the frame subassembly into the notched area when the door subassembly is in the door closed position.

In some aspects, the techniques described herein relate to a vehicle assembly, wherein the door subassembly is hinged to the frame subassembly and configured to pivot relative to the frame subassembly about a vertically extending axis the material shield extending upward from the frame subassembly into the notched area when the door subassembly is in the door closed position.

In some aspects, the techniques described herein relate to a vehicle assembly, further including: a frame subassembly of a tailgate, the door subassembly pivotably connected to the frame subassembly by at least one hinge, the material shield disposed at an interface between the door subassembly and the frame subassembly.

In some aspects, the techniques described herein relate to a vehicle assembly, including: a frame subassembly including a driver side section and a passenger side section; a door subassembly pivotable relative to the frame subassembly back and forth between a door closed position and a door open position, the door subassembly disposed between the driver side section and the passenger side section when the door subassembly is in the door closed position such that the door subassembly separates the driver side section from all portions of the passenger side section; a latch system configured to secure the door subassembly in the door closed position relative to the frame subassembly; and a material shield secured to the latch system.

In some aspects, the techniques described herein relate to a vehicle assembly, wherein the door subassembly and the frame subassembly are pivotable together about a first axis between a tailgate closed position and a tailgate open position, wherein the door subassembly is pivotable relative to the frame subassembly about a second axis between a door closed position and a door open position, the first axis transverse to the second axis.

In some aspects, the techniques described herein relate to a vehicle assembly, wherein the door subassembly in the door open position provides a cargo bed access opening that extends vertically downward at least as far as a vertically bottommost side of a driver side outer panel of the driver side section and a passenger side outer panel of the passenger side section.

In some aspects, the techniques described herein relate to a vehicle assembly, wherein the material shield is secured to a striker bracket of the latch system.

In some aspects, the techniques described herein relate to a vehicle assembly, wherein the material shield is overmolded to the striker bracket.

In some aspects, the techniques described herein relate to a method of shielding areas of a tailgate, including: providing a tailgate assembly that includes a door subassembly pivotably coupled to a frame subassembly, the door subassembly and the frame subassembly pivotable together between a tailgate closed position and a tailgate open position; pivoting the door subassembly relative to the frame subassembly from a door closed position to a door open position to provide a cargo bed access opening; receiving a striker of the frame subassembly within a notch of the door subassembly when the door subassembly is pivoted to the door closed position from the door open position; and blocking debris from entering the notch using a material shield extending from the frame subassembly.

In some aspects, the techniques described herein relate to a method, further including overmolding the material shield to a flange of a striker bracket.

In some aspects, the techniques described herein relate to a method, wherein the material shield is a first material shield and the flange is a first flange, and further including overmolding a second material shield to a second flange of the striker bracket.

In some aspects, the techniques described herein relate to a method, wherein the striker is aft the material shield when the tailgate assembly is in the tailgate closed position and the door subassembly is in the door closed position.

In some aspects, the techniques described herein relate to a method, wherein the material shield extends horizontally when the tailgate assembly is in the tailgate closed position and the door subassembly is in the door closed position.

In some aspects, the techniques described herein relate to a method, wherein the material shield extends vertically upward when the tailgate assembly is in the tailgate closed position and the door subassembly is in the door closed position.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

Figure 1:
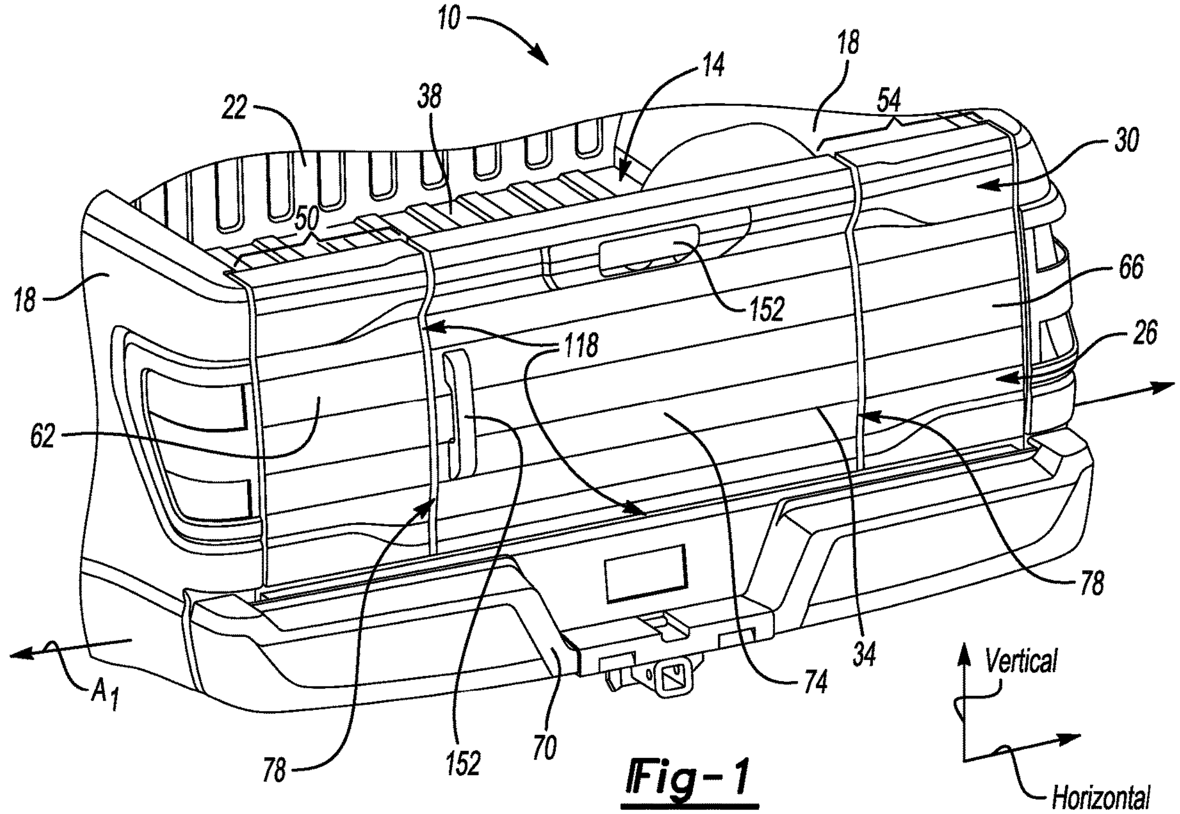
FIG. 1 is a rear perspective view of a motor vehicle equipped with a cargo space and having a tailgate assembly in a tailgate closed position relative to the cargo space.
Figure 2:
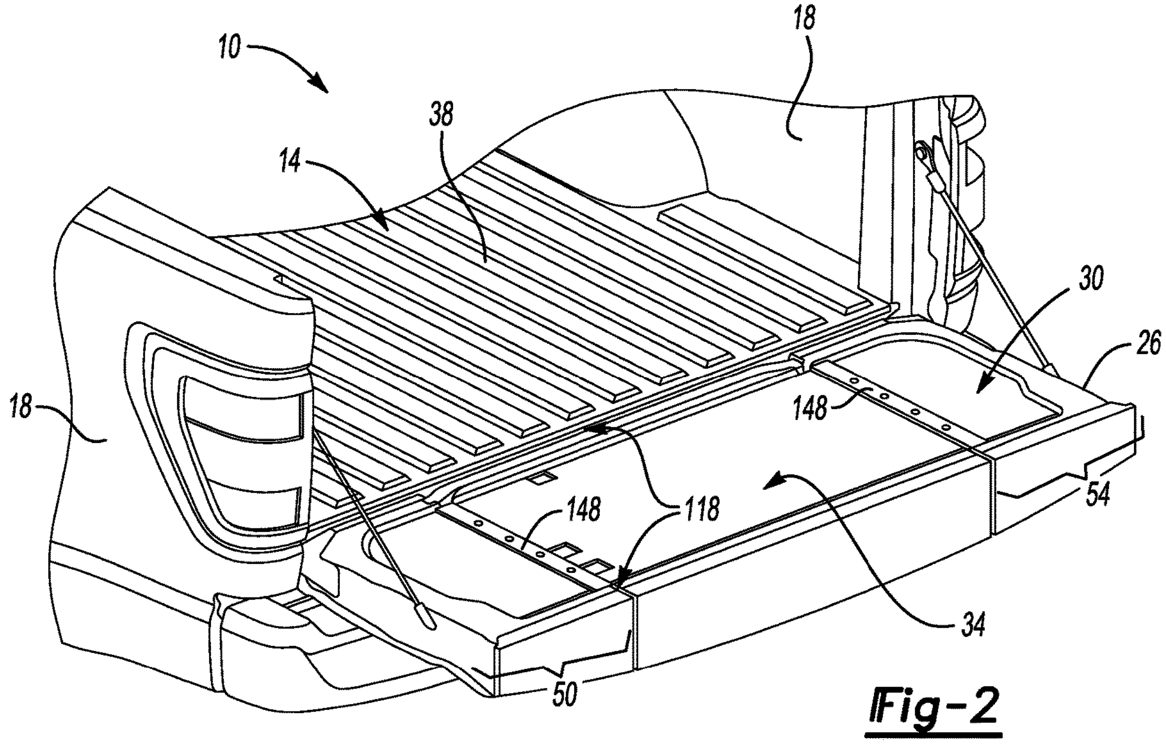
FIG. 2 illustrates the motor vehicle of FIG. 1 with the tailgate assembly in a tailgate open position.
Figure 3:
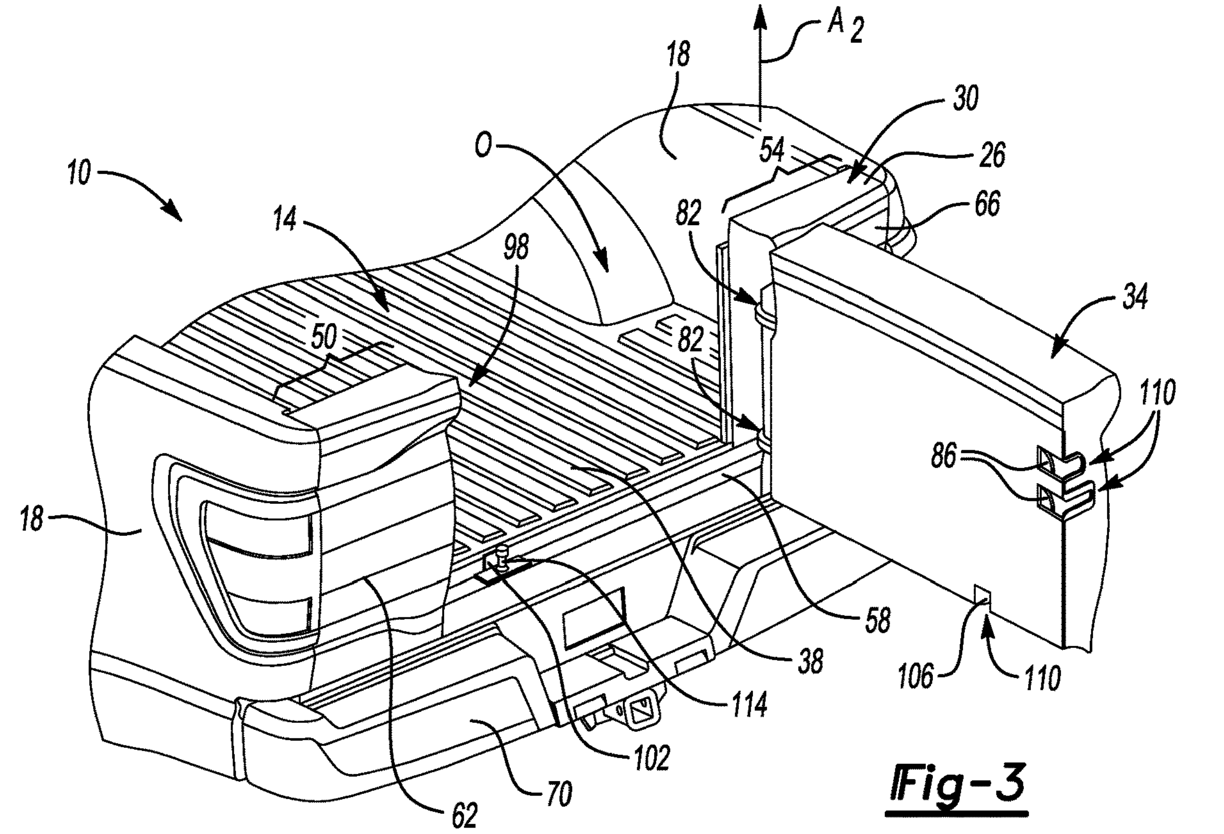
FIG. 3 illustrates the motor vehicle of FIG. 1 with a door subassembly of the tailgate assembly in a door open position.

This disclosure details a material shield of a tailgate.

The tailgate can include a door subassembly. The door subassembly can be opened to provide an opening that, among other things, helps a user to access cargo within a cargo bed. The material shield assembly can be used to block material from entering areas between the door subassembly and another portion of the tailgate.

With reference to FIGS. 1-4, a vehicle 10, according to an exemplary aspect of the present disclosure, is a pickup truck. The vehicle 10 has a cargo bed 14 that is provided by a pair of sidewalls 18, a front wall 22, and a tailgate assembly 26. The cargo bed 14 can hold various types of cargo, including material, such as mulch, rocks, dirt, etc.

The tailgate assembly 26 includes, among other things, a frame subassembly 30 and a door subassembly 34. The tailgate assembly 26 is pivotable about a first axis A1 relative to the cargo bed 14 between a tailgate closed position shown in FIG. 1 and a tailgate open position shown in FIG. 2. The example tailgate assembly 26 is vertically aligned when in the tailgate closed position and horizontally aligned when in the tailgate open position. Vertical and horizontal, for purposes of this disclosure, are with reference to ground and an ordinary orientation of the vehicle 10 during operation.

The door subassembly 34 is in a door closed position and is latched to the frame subassembly 30 when the frame subassembly 30 and the door subassembly 34 are pivoted between the tailgate closed position and the tailgate open position. Thus, the frame subassembly 30 and the door subassembly 34 pivot together when the tailgate assembly 26 is pivoted between the tailgate closed position and the tailgate open position.

When the tailgate assembly 26 is in the tailgate closed position, the door subassembly 34 is pivotable relative to the frame subassembly 30 about a second axis A2. The door subassembly 34 can pivot back and forth between a door closed position shown in FIG. 1 and a door open position shown in FIGS. 3 and 4. The first axis A1 is a horizontally extending axis in this example. The second axis A2 is transverse to the first axis A1 and is a vertically extending axis in this example. Horizontal and vertical are, for purposes of this disclosure, with reference to ground and a general orientation of the vehicle 10 during ordinary operation.

The door subassembly 34 in the door open position provides a cargo bed access opening O. In this example, the cargo bed access opening O extends vertically downward at least as far as a floor 38 of the cargo bed 14.

Figure 4:
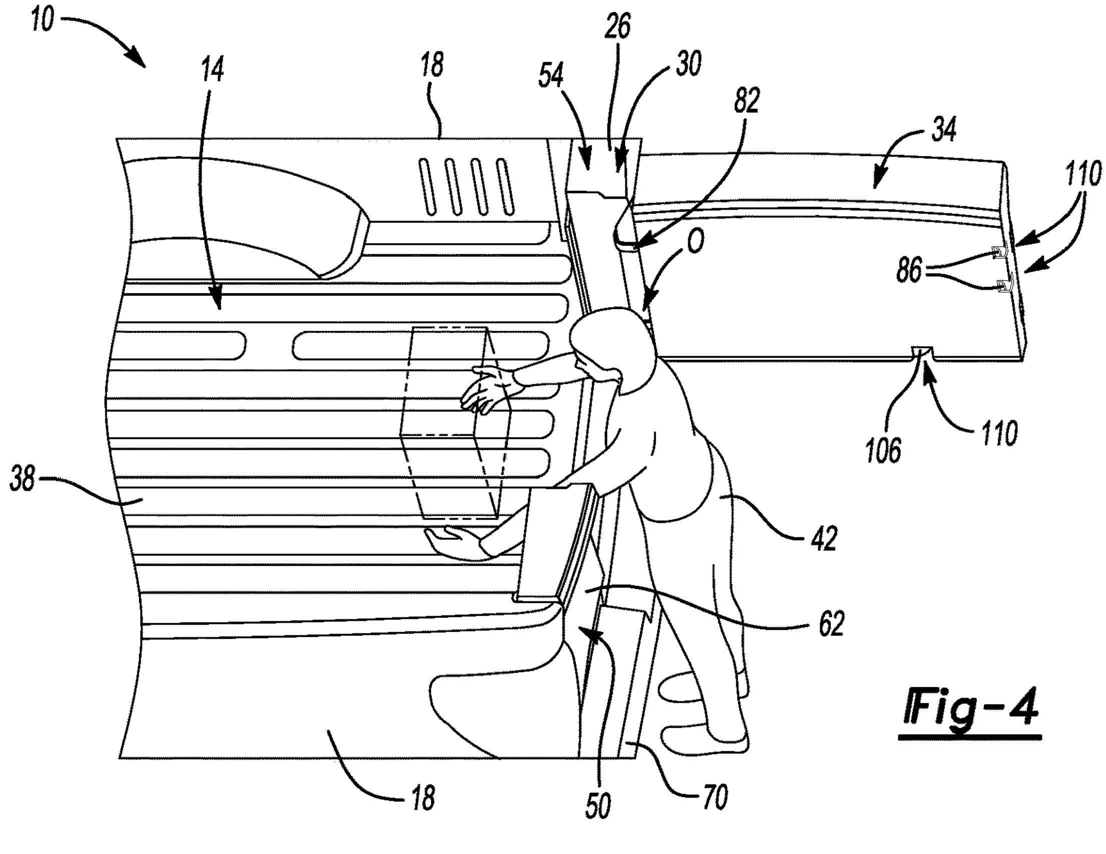
FIG. 4 illustrates an overhead view of the tailgate assembly in the position of FIG. 3.

As shown in FIG. 4, a user 42 can access the cargo bed 14 through the cargo bed access opening O provided by the door subassembly 34 in the door open position. Placing the door subassembly 34 in the door open position allows the user 42 to move closer to the cargo bed 14 than, for example, if the tailgate assembly 26 were moved to the tailgate open position of FIG. 2. The cargo bed access opening O can also provide clearance for the user 42 to enter the cargo bed 14 to load or retrieve cargo.

The frame subassembly 30 includes, among other things, a driver side section 50, a passenger side section 54, and a connection member 58. The driver side section 50, the passenger side section 54, and the connection member 58 pivot together when the frame subassembly 30 is moved between the tailgate closed position and the tailgate open position. A portion of the connection member 58 can dip vertically downward to keep the connection member 58 below the floor 38 of the cargo bed 14.

The driver side section 50 includes an outer panel 62, and the passenger side section 54 includes an outer panel 66. When the tailgate assembly 26 is in the tailgate closed position of FIG. 1, the panels 62 and 66 can be viewed by an individual standing behind the vehicle 10. The connection member 58, however, is concealed from view behind a bumper 70 or a fascia for example.

The door subassembly 34 includes an outer panel 74 that is also visible to a user when the tailgate assembly 26 is in the tailgate closed position of FIG. 1. When the door subassembly 34 is in the door closed position, the outer panel 74 of the door subassembly 34 separates the outer panel 62 of the driver side section 50 from all portions of the outer panel 66 of the passenger side section 54. When the door subassembly 34 is in the door open position, the cargo bed access opening O extends vertically downward at least as far as the vertically bottommost sides of the outer panel 62 of the driver side section 50 and the outer panel 66 of the passenger side section 54.

Notably, no portion of the panel 62 or the panel 66 horizontally overlaps with the outer panel 74 of the door subassembly 34. That is, the outer panel 62 of the driver side section 50 does not include a section extending vertically beneath the panel 74 of the door subassembly 34, and the outer panel 66 of the passenger side section 54 does not include a section extending vertically beneath the outer panel 66 of the door subassembly 34. Instead, the door subassembly 34 is incorporated into the tailgate assembly 26 utilizing only two split lines 78 extending vertically across the tailgate assembly 26. Thus, the door subassembly 34 is incorporated into the tailgate assembly 26 with relatively little aesthetic disruption.

The door subassembly 34 is pivotably coupled to the frame subassembly 30 through a hinge system that includes, in this example, two hinges 82. In this example, the door subassembly 34 is pivotably coupled to the passenger side section 54. In another example, the door subassembly 34 is pivotably coupled to the driver side section 50.

The hinges 82 are gooseneck hinges in this example. The hinges 82 permit the door subassembly 34 to pivot relative to the frame subassembly 30, and to pivot well away from the cargo bed access opening O. The hinges 82 can include two door check positions, say at forty-five and ninety degrees. The door subassembly 34 can pivot one-hundred degrees when transitioned from the closed door position to a fully open door position. One of the hinges 82 is vertically above the other one of the hinges 82.

Figure 5:
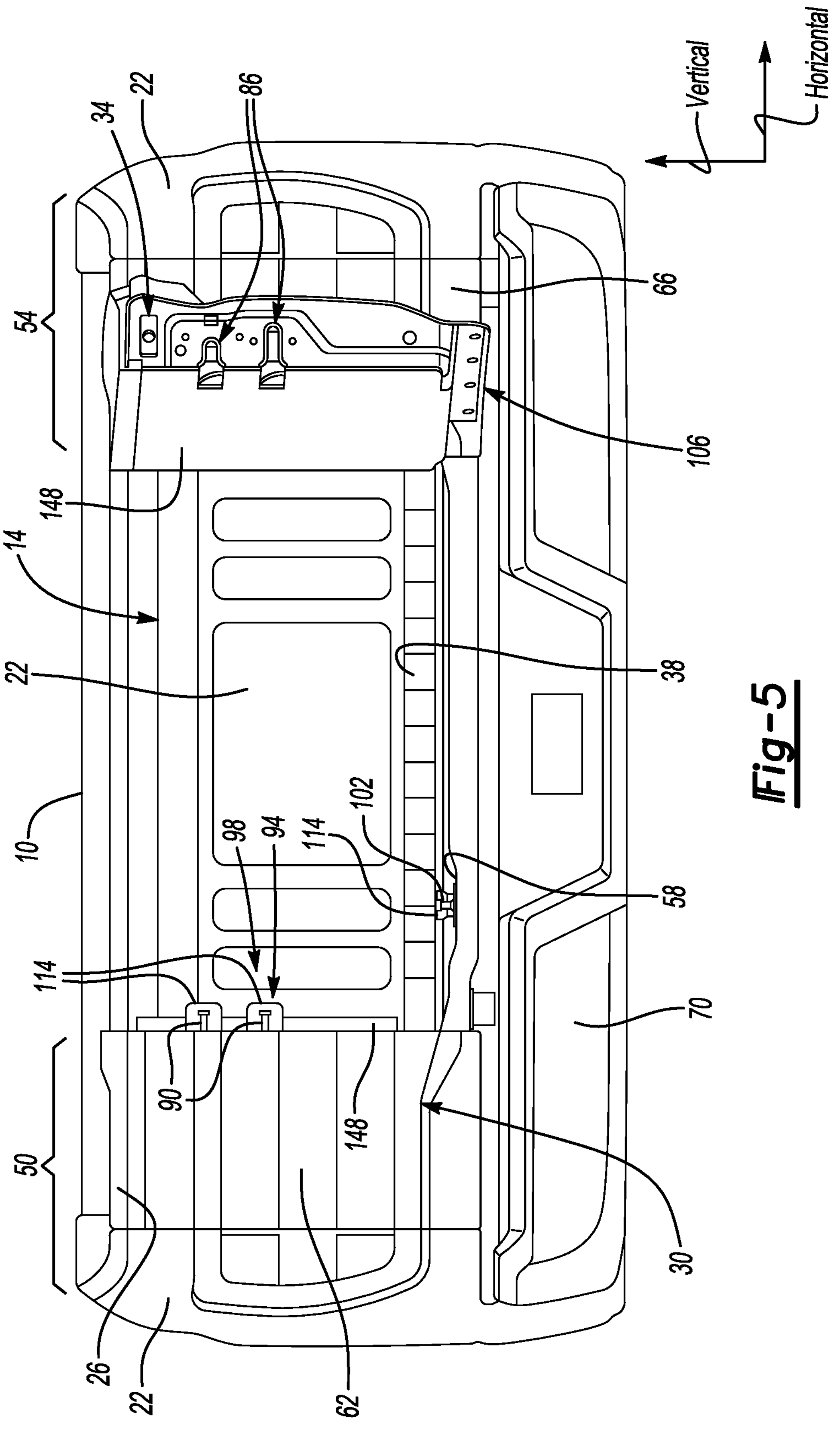
FIG. 5 illustrates a view of the tailgate in the position of FIG. 3 looking out from within a cargo bed of the motor vehicle.
Figure 6:
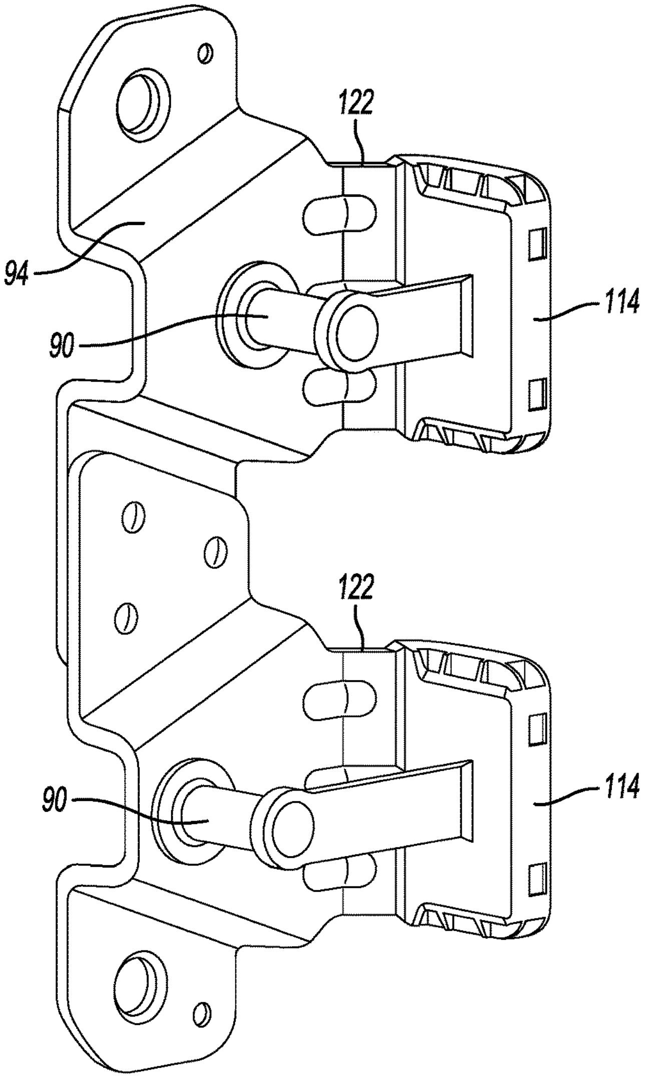
FIG. 6 illustrates a striker bracket from the tailgate assembly of FIG. 1 holding two material shields.
Figure 7:
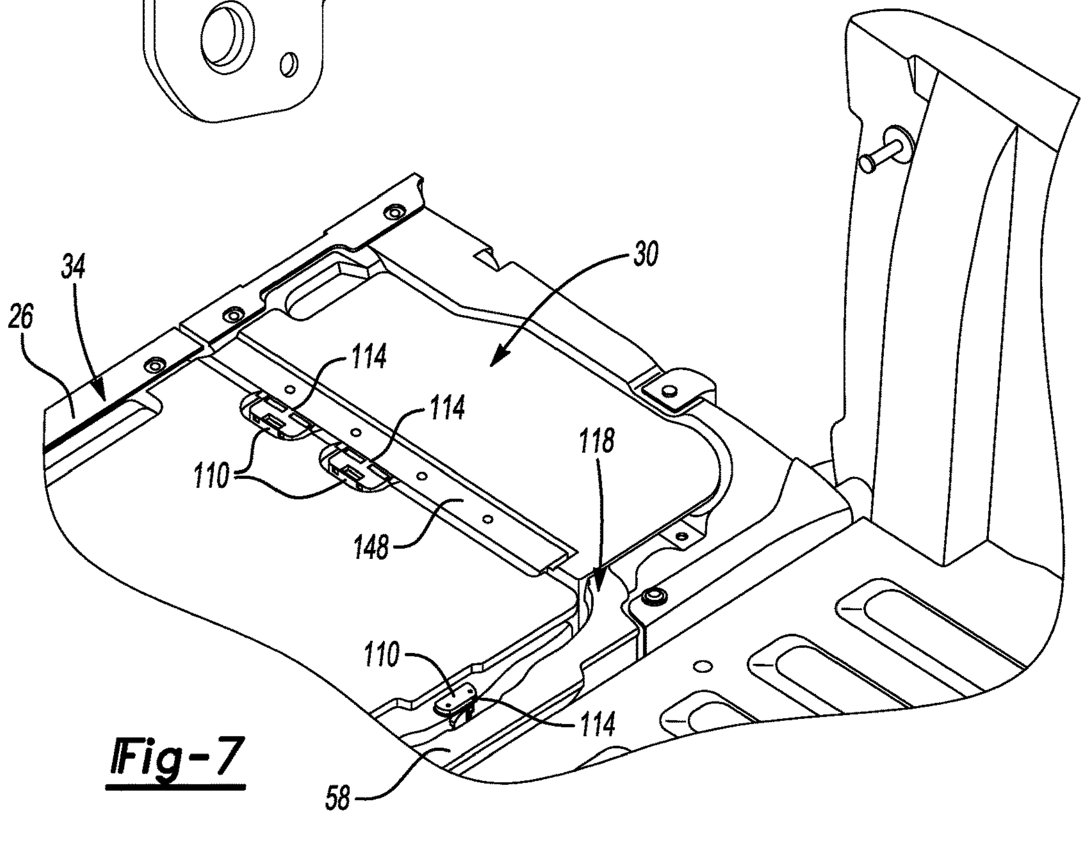
FIG. 7 illustrates a close up, perspective view of a portion of the motor vehicle with the tailgate assembly in the open position as shown in FIG. 2.

With reference now to FIGS. 5-7 and continuing reference to FIGS. 1-4, when the door subassembly 34 is in the door closed position, a latch system is used to secure the door subassembly 34 to the frame subassembly 30. The example latch system includes at least one upper latch 86 that engages a respective upper striker 90 to hold the door subassembly 34 in the door closed position.

In this example, a striker bracket 94 is mounted to an inboard side 98 of the driver side section 50. The example striker bracket 94 includes two upper strikers 90. The door subassembly 34 includes two of the upper latches 86—each is configured to engage one of the two upper strikers 90.

A lower striker 102 is also mounted to the connection member 58 of the frame subassembly 30 at the bottom of the cargo bed access opening O. A lower latch 106 at the bottom of the door subassembly 34 can engage the lower striker 102 that is mounted to the connection member 58.

The door subassembly 34 includes a notched area 110 associated with each of the upper strikers 90 and the lower striker 102. The notched areas 110 allow the upper strikers 90 and the lower striker 102 to be received by the respective upper latches 86 and the lower latch 106 as the door subassembly 34 pivots to the door closed position. The notched areas 110 provide clearance.

The tailgate assembly 26 includes material shields 114 disposed at an interface 118 between the door subassembly and the frame subassembly. In this example, a material shield 114 extends into each of the notched areas 110 when the door subassembly 34 is in the door closed position.

When the door subassembly 34 is in the door closed position, the material shields 114 block material from moving into the gaps established by the notched areas 110. The material can be, for example, mulch, stone, construction materials, leaves, etc. Blocking material from moving into the notched areas 110 can help to keep the material within the cargo bed 14 and to prevent the material from interfering with actuation of the upper latches 86 and the lower latch 106. The material shields 114 can also deflect water from flowing directly into the notched areas 110, particularly the notched area 110 associated with the lower latch 106.

When the tailgate assembly 26 is in the tailgate open position, the material shields 114 can, in addition to blocking material from moving into the notched areas 110, provide a relatively planar worksurface extending along an inner side of the tailgate assembly 26.

The material shields 114 face the cargo bed 14 and are forward the respective upper strikers 90 when the tailgate assembly 26 is in the tailgate closed position. The upper strikers 90 are aft the respective material shield 114 when the tailgate assembly 26 is in the tailgate closed position.

In this example, the material shields 114 along the inboard side 98 of the driver side section 50 are mounted to respective flanges 122 of the striker bracket 94. The material shields 114 are overmolded to the flanges 122 in this example, which secures the material shields 114 relative to the flanges 122. Overmolding the material shields 114 structurally distinguishes the material shields 114 from other material shields that are not overmolded. That is, a person having skill in this art would be able to structurally distinguish material shields that are overmolded from material shields that are not overmolded.

The material shields 114 can be a rubber material, such as ethylene propylene rubber. When the door subassembly 34 is pivoted to the door closed position, the material shields 114 can act as bumpers that provide the door subassembly 34 with a relatively soft interface to close against.

When the door subassembly 34 is in the door closed position, the material shields 114 that are disposed along the inboard side 98 of the driver side section 50 extend horizontally from the frame subassembly 30 into the notched areas 110. The material shield 114 at the vertical bottom of the door subassembly 34 extends upward from the frame subassembly 30 into the notched area 110 when the door subassembly is in the door closed position.

As mentioned previously, the door subassembly 34 is incorporated into the tailgate assembly 26 utilizing only two split lines 78 extending vertically across the tailgate assembly 26. Seal flaps 148 are attached to the tailgate assembly 26 to block material from moving into these split lines 78. The seal flaps 148, however, do not extend to overlap the notched areas 110.

The upper latches 86 and the lower latch 106 can be electronic latches. The door subassembly 34 can be include one electronic handle 152 that a user can pull to trigger the upper latches 86 and the lower latch 106 to actuate.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle assembly, comprising:

a striker of a tailgate assembly, the striker mounted to a frame subassembly of the tailgate assembly;

a door subassembly of the tailgate assembly, the door subassembly having a latch configured to engage the striker to hold the door subassembly in a door closed position, the door subassembly having a notched area that receives the striker when the door subassembly is pivoted from a door open position to a door closed position, wherein the door subassembly is hinged to the frame subassembly and configured to pivot relative to the frame subassembly about a vertically extending axis, wherein the door subassembly is incorporated into the tailgate assembly along two split lines;

a material shield extending into the notched area when the door subassembly is in the door closed position, wherein the material shield extends horizontally from the frame subassembly into the notched area when the door subassembly is in the door closed position; and seal flaps attached to the tailgate assembly at the split lines to block material from entering the split lines, wherein the seal flaps do not extend to overlap the notched area.

2. The vehicle assembly of claim 1, wherein the striker is aft the material shield.

3. The vehicle assembly of claim 2, wherein the material shield is overmolded to a flange.

4. The vehicle assembly of claim 2, wherein the striker is part of a striker bracket, wherein the material shield is mounted to a flange of the striker bracket.

5. The vehicle assembly of claim 4, wherein the striker is a first striker and the material shield is a first material shield that is associated with the first striker, wherein the striker bracket includes the first striker and a second striker, wherein a second material shield is mounted to the striker bracket, the second material shield associated with the second striker.

6. The vehicle assembly of claim 1, wherein the door subassembly is hinged to the frame subassembly and configured to pivot relative to the frame subassembly about a vertically extending axis, the material shield extending upward from the frame subassembly into the notched area when the door subassembly is in the door closed position.

7. The vehicle assembly of claim 1, wherein the material shield is configured to contact the door subassembly to provide a bumper surface when the door subassembly is pivoted to the door closed position.

8. The vehicle assembly of claim 7, wherein the material shield provides a relatively soft interface between the door subassembly and the frame subassembly when the door subassembly is in the door closed position.

* * * * *